United States Patent [19]

Lindblad

[11] 4,087,059

[45] May 2, 1978

[54] ACTIVATING ORGAN PREFERABLY TO BE USED IN CONNECTION WITH BAND REELS OF SAFETY BELTS FOR VEHICLES

[76] Inventor: Oskar Lennart Lindblad, Hedasgatan 6, 440 20 Vargarda, Sweden

[21] Appl. No.: 637,052

[22] Filed: Dec. 2, 1975

[30] Foreign Application Priority Data

Dec. 3, 1974 Sweden .............................. 7415098

[51] Int. Cl.² ....................... A62B 35/02; B65H 75/48
[52] U.S. Cl. ............................................ 242/107.4 A
[58] Field of Search .............................. 242/107.4 A; 280/744–747; 297/388

[56] References Cited

U.S. PATENT DOCUMENTS

| 3,722,824 | 3/1973 | Hayashi | 242/107.4 A |
| 3,868,068 | 2/1975 | Heath | 242/107.4 A |
| 3,913,861 | 10/1975 | Stephenson | 242/107.4 A |
| 3,923,269 | 12/1975 | Kell | 242/107.4 A |

Primary Examiner—Harvey C. Hornsby
Assistant Examiner—John M. Jillions
Attorney, Agent, or Firm—Ulle C. Linton

[57] ABSTRACT

A band reel device for safety belts for vehicles provided with a locking mechanism which becomes activated when the safety belt connected to the reel is rapidly pulled out from the reel and an adjustably mounted body of inertia operatively connected to the locking mechanism for actuating the locking mechanism when there is an abnormal change of movement of the vehicle carrying the band reel device.

9 Claims, 12 Drawing Figures

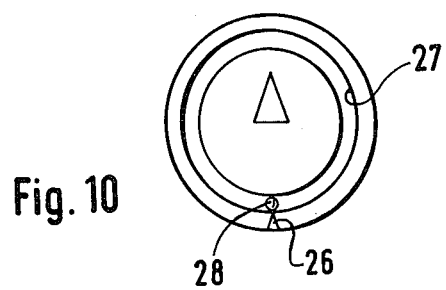
Fig. 10
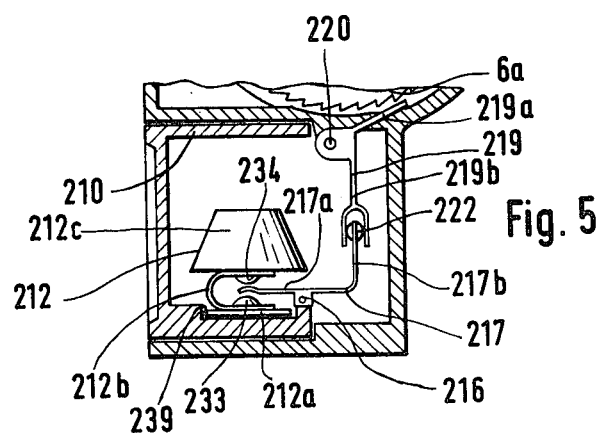
Fig. 5
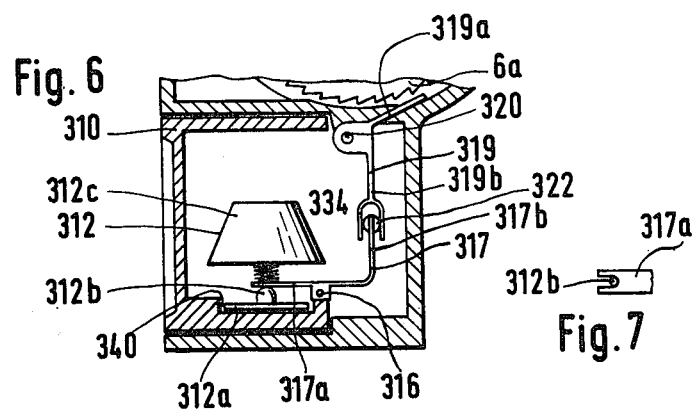
Fig. 6
Fig. 7

ACTIVATING ORGAN PREFERABLY TO BE USED IN CONNECTION WITH BAND REELS OF SAFETY BELTS FOR VEHICLES

The present invention relates to an activating organ preferably to be used in connection with band reels of safety belts for vehicles and comprising an acceleration and/or retardation sensing body of inertia together with transmission elements for the transmission of the movements of the body of inertia to a locking mechanism acting upon the band reel in order to actuate the same, when unnormal changes of the movement of the vehicle in question take place.

It is a principle object of the invention to provide an activating organ of the kind mentioned, by means of which a simple adjustment of the position of the same is made possible irrespective of the position of inclination of the band reel.

This object is reached by means of an activating organ according to the invention substantially characterized by the body of inertia being supported by a supporting body, which is pivotable relative to the bearing of the band reel and by the transmission comprising a flexible or articulated part, which makes possible a movement of the holder of the body of inertia relative to the bearing of the band reel, i.e. also relative to a frame portion including the bearing of the band reel.

Figure 1:
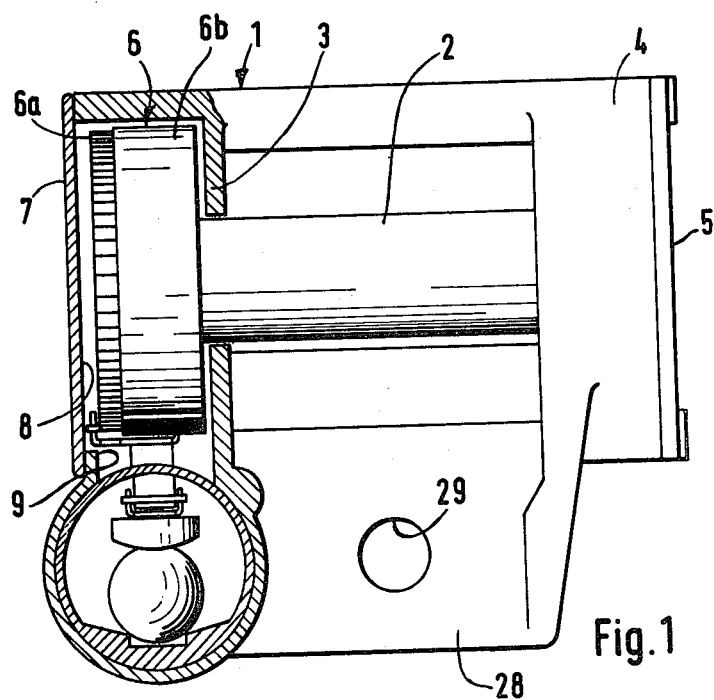
Figure 2:
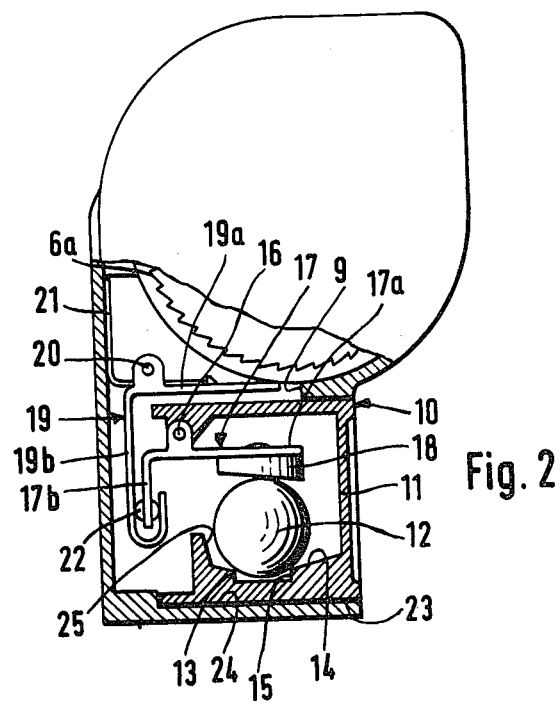
Figure 3:
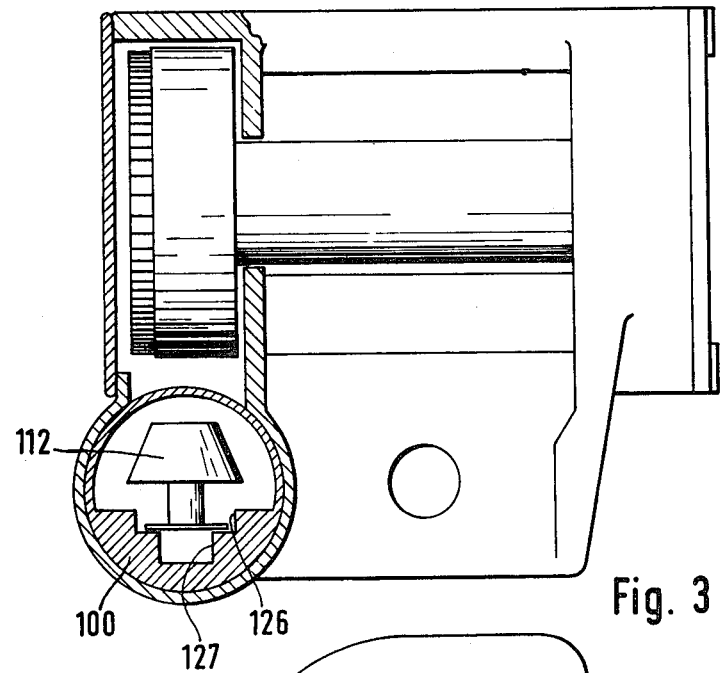
Figure 4:
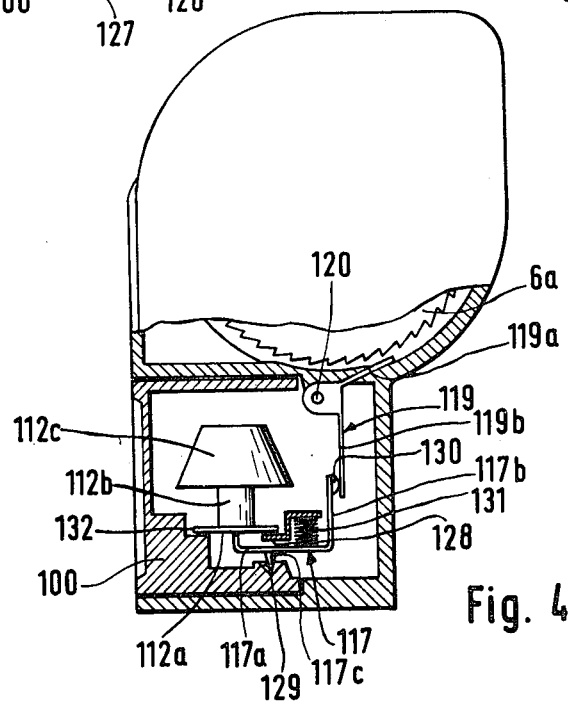
Figure 8:
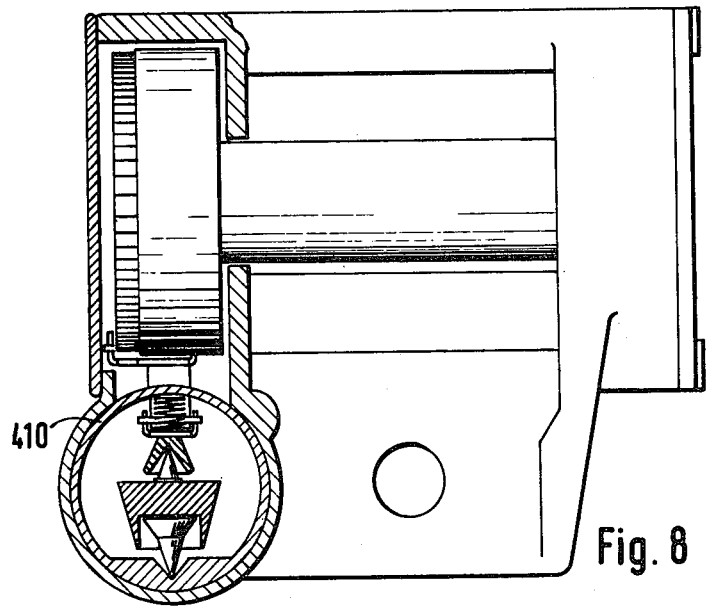
Figure 9:
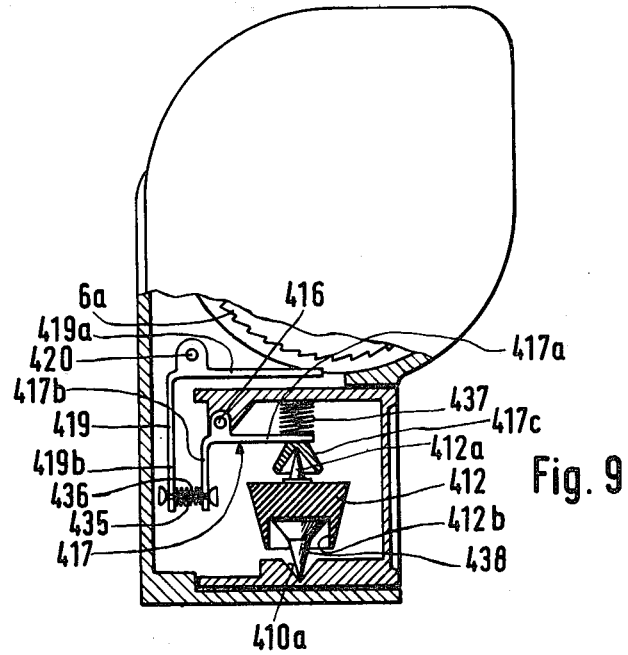
Figure 11:
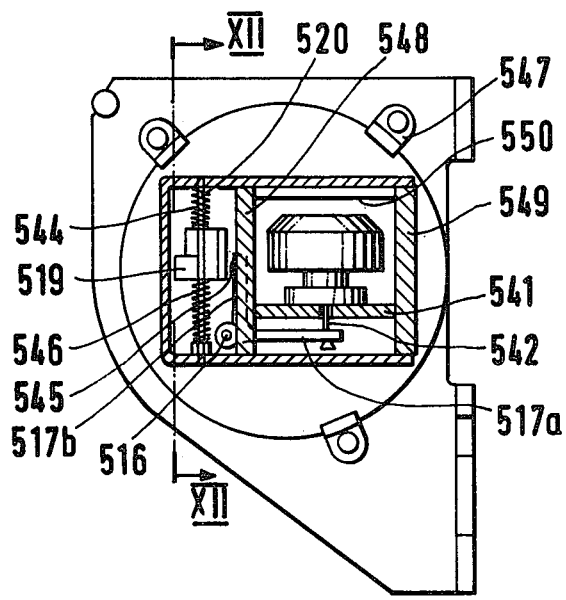

In the following some examples of embodiment of the invention are described with reference to the accompanying drawings, in which FIG. 1 is a partly broken view of a band reel device for safety belts for vehicles provided with an activating organ according to the invention, FIG. 2 likewise is a partly broken view of the same device taken from the left in FIG. 1, FIG. 3 is a view corresponding to FIG. 1 and illustrating a band winding up device provided with an activating organ according to a second example of embodiment, FIG. 4 is a view corresponding to FIG. 2 illustrating the band winding up device shown in FIG. 3, FIG. 5 is a view corresponding to FIG. 4 illustrating an activating organ according to a third example of embodiment, FIG. 6 is a view corresponding to FIG. 5 illustrating an activating organ according to a fourth example of embodiment, FIG. 7 is a top view of a detail forming part of the activating organ according to FIG. 6, FIG. 8 is a view corresponding to FIG. 1 and illustrating a band winding up device, which is provided with an activating organ according to a fifth example of embodiment, FIG. 9 is a view corresponding to FIG. 2 illustrating the band winding up device shown in FIG. 8, FIG. 10 is a view as seen from the right in the FIGS. 2 and 9 and from the left according to the FIGS. 4–6 illustrating the part of the band winding up devices, which forms the activating organ visualizing a position indicator belonging to the activating organs, FIG. 11 is a schematic cross sectional view of an activating organ according to still another embodiment taken along the line XI—XI of FIG. 12, and FIG. 12 finally is a view of a cross section through the same activating organ along the line XII—XII of FIG. 11.

In FIG. 1 a first example of embodiment of a band winding up device for vehicles is illustrated, where the winding up mechanism itself can be of conventional type. In the example of embodiment illustrated the winding up mechanism comprises a core 2 supported in a frame 1. The bearing support of the core 2 comprises two walls 3 extending crosswise to said core in the frame, which in its entirety is indicated with 1. The walls 3 are located at a distance in between them somewhat exceeding the width of the band, which shall be wound up on the device. This band for clarity's sake is not shown in the drawing. The right portion of the frame 1, according to FIG. 1, is shaped like a housing 4, which contains a helical spring similar to a watch spring and tending to pivot the core 2 in its winding up direction. One side of the housing 4 is closed by means of a lid 5. The opposite end of the core 2 supports a locking mechanism, in its entirely indicated with 6, which mechanism can be of an in itself known type, suitably containing a lock sensitive to angular accelerating, i.e., a lock, which passes to an activating position, when the band of the safety belt in question is rapidly pulled out. This lock sensitive to angular acceleration can also be activated by a ratchet wheel 6a located outside of said lock being braked and thereby getting a somewhat slower motion than the cylindrical housing surrounding the locking mechanism, which housing is indicated with 6b. The locking mechanism 6 is on three sides surrounded by the frame 1, which thus shapes a housing, the side of which is closed by means of a lid 7. In its lower portion the frame exhibits a portion 28 serving as an anchoring means and in which portion an anchoring hole 29 has been taken up, in mounted condition of a vehicle intended to be passed through by an anchoring bolt. The lower portion of the housing 8 formed by the left part of the frame, according to FIG. 1, passes to a substantially cylindrical house portion, which according to the FIG. 2 is open to the right, said house portion via an opening 9 being in communication with the upper portion enclosing the locking mechanism. A body 10 of tubular shape is introduced into the lower cylindrical portion of the housing 8, one end of said body being covered by a wall 11. The body 10 of tubular shape serves as a support for a spherical body of inertia 12 resting upon a seat of annular shape located in the lower portion of the supporting body 10.

The seat of annular shape 13 is formed by the portion of transition between a bottom portion 14 exhibiting the shape of a conical mantle and sloping towards its center and a centric bottom hole 15. In the upper portion a double-armed lever 17 bent substantially at right angle is pivotably journaled by means of a shaft 16, one arm 17a of said lever 17 extending substantially in horizontal direction and the other arm 17b extending substantially downwards in vertical direction. The shaft 16 in its turn is supported by the upper wall portion of the supporting body 10 and substantially extends parallel to the winding up core 2. The lever arm 17a bears against the spherical body of inertia 12 via a spacer organ 18, the underside of which slopes upwards counted in direction towards the left according to FIG. 2. Another lever is indicated with 19, said lever likewise being bent substantially at a right angle, i.e., with one arm 19a extending in horizontal direction and a second arm 19b extending substantially in vertical direction. The lever 19 is supported by a shaft 20 in pivotable mounting, said shaft 20 being parallel to the shaft 16 and in its turn being supported by the frame 1. A spring 21 extends between the frame 1 and the lever arm 19a and bears against the top side of the arm 19a tending to pivot the lever 19 in clockwise direction and consequently the arm 19a in direction away from the ratchet wheel 6a. In its lower portion the arm 19b is bent in U-shape and by means of this lower portion grips around a ball 22 of a bearing traversing the arm 17b, the position of said ball coinciding with the longitudinal center of the supporting body 10. The exterior surface 23 of the supporting body 10 exhibits a diameter, which is slighly smaller than the one of a corresponding inner surface 24 of the portion of the frame 1 forming the lower portion of the housing 8. The adjustment can suitably be such a one that a certain frictional resistance has to be oversome in order to permit the pivoting of the supporting body 10 relative to the frame 1.

When the vehicle, in which the winding up device is mounted, is subjected to an unnormal change of speed in one or the other direction, which by way of example takes place in connection with a collision, the body of inertia 12, which of course does not necessarily have to be made as a sphere, will tilt on the annular supporting surface 13, which brings in its train that said body is given a movement in upwards direction, i.e., its contact point against the spacer organ 18 is raised, and the lever 17 is pivoted in counter clockwise direction. This movement is transmitted to the lever 19 via the central bearing 22 against bias of the spring 21, the arm 19a being brought to engage the ratchet wheel 6a activating the locking device, whereby a continued pulling out of the band is made impossible. By means of the sloping shape of the lower surface of the spacer organ 18 as illustrated in the FIG. 2 a compensation of the pivoting movement of the lever 17 is obtained, which movement otherwise would vary depending upon the direction, in which the body 12 of inertia is moving as a consequence of the displacement of the contact point and the change of the length of the moment arm caused thereby. The sidewise movement of the body 12 of inertia is limited by a stop dog 25 surrounding the same. However, in certain cases it may be desirable to mount the winding up device in such a way that the band core 2 inclines in one or the other direction according to the design of the space of the vehicle, in which the winding up device shall be installed. In this case it is required that the activating organ is adjusted in the vertical position illustrated in the drawing by pivoting the supporting body 10, in which connection the shafts 16 and 20 and consequently also the two lever arms 17 and 19 are pivoted in which a manner that their arms 17b and 19b respectively are pivoted in a plane around the bearing point 22 forming a right angle relative to the axis of the supporting body 10. On account of the position of the bearing 22 the pivoting positions of the levers are therefore not changed relative to the supporting body 10 and the frame 1 respectively. In the example of embodiment shown the supporting body 10 is pivotable around an axis, which is perpendicular to the winding up core 2 and located at a distance below the same, but of course it does not means any departure from the fundamental idea of the invention, if the supporting body 10 is given any other location or direction. It is of course also within the scope of the invention to design the supporting body with a non-cylindrical bearing surface. Such a bearing surface might by way of example be conical or in certain cases even spherical, whereby in the latter case a pivoting in all directions is made possible. The wall of the supporting body 10 exhibits an arrow shaped marking 26 and a groove 27 occupying a concentric position relative to the pivoting axis, in which groove a ball 28 with free motion is supported. When the marking 26, which shall be made in the portion, which in normal position of use shall be located pointing downwards, is moved to a position, which coincides with the ball 28, the supporting body 28 and the body of inertia are adjusted in the required position for its proper function.

In connection with the embodiments illustrated in the other figures, the frame, the locking device, and the band reel are principally of the same design as in the example illustrated in FIG. 1, because of which these parts will not be again described in connection with the other examples of embodiment.

In FIGS. 3 and 4 the supporting body is indicated with 110, the body of inertia with 112, the lever in contact with the body of inertia with 117, and the lever cooperating with the ratchet wheel 6a is indicated with 119. The body of inertia 112 comprises a disc shaped base portion 112a, a narrower intermediate portion 112b, and a comparatively heavy upper portion 112c. The body of inertia rests with its base portion on an annular bearing surface, which is formed as a seat at the transition between two vertical bores 126 and 127 in the bottom portion of the supporting body 100. The lever 117 extends through an opening 128 in said bottom portion and reaches into the centric bore 127 with one of its lever arms 117a bearing in centric position against the underside of the body of inertia. The bearing of the lever 117 comprises a wedge shaped projection 117c, which rests in a corresponding cavity 129 in the bottom portion of the supporting body. The cavity 129 exhibits an acute angle, which is more obtuse than the acute angle of the projection 117c. The other lever arm 117b of the lever 117 is pointing upwards and provided with a spherical projection 130, which bears against the lever arm 119b of the lever. The other lever arm of the lever 119 arranged at the tilting movement of the body of inertia to engage the ratchet wheel 6a is indicated with 119a its journal being the shaft 120. A pressure spring 131 is inserted between the lever arm 117b and the supporting body 100. When the body 112 of inertia is subjected to a lateral force, it tilts on the seat 132 located between the bores 126 and 127, which means that the spring 131, which all the time tends to keep the lever arm 117a pressed against the underside of the body of inertia, can pivot the same in clockwise direction and give the lever arm 119 a pivoting movement in counter clockwise direction round the shaft 120, whereby the lever arm 119a is brought in engagement with the ratchet wheel 6a thereby starting the activation of the locking mechanism.

In FIG. 5 the supporting body is indicated with 210, the body of inertia is indicated with 212, the lever in contact with the body of inertia is indicated with 217, and the lever engaging the ratchet wheel 6a is indicated with 219. The body of inertia 212 exhibits a disc shaped base portion 212a, which supports an upper portion 212c of comparatively great mass via an in U-shape bent intermediate part 212b, which suitably can be made of band material and be fastened in the base portion and in the upper portion by means of rivets, the heads of which are indicated with 233 and 234 respectively. The rivet heads 233 and 234 exhibit a spherical shape and are located at such a distance in between them that the end portion of one of the lever arms 217a of the lever 217 can be accommodated between them, the portion of said lever arm 217a located between the rivet heads 233 and 234 being bent to a concave shape as seen from below. The other lever arm 217b of the lever 217 is provided with a ball shaped bearing body 222 as was the case with the corresponding lever arm illustrated in FIGS. 1 and 2. The bearing body 222 is gripped by a forkshaped end portion of the lever arm 219b of the lever 219. The lever arm of this lever cooperating with the ratchet wheel 6a is indicated with 219a, and the lever 219 is pivotably journaled round a shaft 220, while the lever 217 is pivotably journaled round a shaft 216, which in its turn is supported by the supporting body of the body of inertia. When the body 212 of inertia is subjected to a laterally directed movement, the point of contact between the same and the lever arm 217a is lifted up, whereby the lever 217 is pivoted in clockwise direction round the shaft 216, which in its turn brings about a pivoting of the lever 219 in counter clockwise direction round the shaft 220 leading to an engagement of the ratchet wheel 6a, whereby in the manner described above the locking device is activated.

In the example of embodiment illustrated in the FIGS. 6 and 7 the supporting body of the body of inertia is indicated with 310, the body of inertia is indicated with 312, the lever cooperating body the body of inertia is indicated with 317, and the lever cooperating with the ratchet wheel 6a is indicated with 319. The lever 319 exhibits the same design as the corresponding lever in the preceding figure and in the same manner pivotable round a shaft 320. The lever arm of the lever 319 cooperating with the lever 317 is indicated with 319b, and its lever arm cooperating with the ratchet wheel is indicated with 319a. The lever arm of the lever 317 cooperating with the lever 319 is indicated with 317b and its lever arm cooperating with the body of inertia is indicated with 317a. Its journal shaft is indicated with 316. The body of inertia comprises a base plate 312a, an upper portion 312c of a comparatively great mass, and a narrower intermediate portion 312b, which in its turn exhibits a heavier lower portion and a lighter upper portion. The lower portion is rounded off in upwards direction, and the lever arm 317a is kept pressed against the same by means of a pressure spring 334. The lever arm 317a grips the narrower portion of the intermediate portion 312b by means of a fork shaped end portion. The function of the activating organ illustrated in the FIGS. 6 and 7 is substantially the same as of the activating organ, which is shown in FIG. 5, because of which it does not require any more detailed description here.

In the FIGS. 8 and 9 the supporting body of the body of inertia is indicated with 410, the body of inertia is in its entirety indicated with 412, the lever cooperating with the body of inertia is indicated with 417, and the lever cooperating with the ratchet wheel 6a is indicated with 419. The arms 417b and 419b of the two levers are interconnected by means of a bar 435 coinciding with the pivoting axis of the supporting body 410 of the body of inertia, said bar 435 being thicker in dimension at its two ends and surrounded by a pressure spring 436 extending between the two lever arms 417b and 419b, which spring tends to keep the two lever arms pressed against the thicker end portions of the bar 435. The lever arm cooperating with the ratchet wheel 6a is indicated with 419a and the lever arm cooperating with the body of inertia is indicated with 417a. Between the lever arm 417a and inner surface of the supporting body of the body of inertia a pressure spring 437 is extending and tending to keep this lever arm pressed against the top side of the body of inertia. The body of inertia can suitably be designed and is described in the Swedish Pat. No. 387,854. The body of inertia illustrated in the FIGS. 8 and 9 has been given the design as was evident from the FIGS. 1-3 of the previously mentioned application for patent. The body of inertia 412 forms part of a spacer element comprised by two in between them pivotable parts 412, 438 of toggle type, which spacer element extends between the bottom portion of the supporting body 410 of the body of inertia serving as bearing surface and the lever arm 417a serving as an element of transmission, the ends of said distance element being pivotably journaled at said lever arm 417a and said bearing surface respectively. It is of course within the scope of the invention to use more than two in between them articulated parts. The body of inertia 412, which is made of comparatively heavy material, exhibits substantially the shape of the frustum of a cone with the larger base turned upwards, a pointed conical projection 412a protruding from the upper base surface and resting in a cavity of a seat 417c arranged on the lever arm 417a, which seat suitably can be made of plastic or other light material. The seal 417c has the shape of the frustum of a cone with the larger base turned downwards, which seat at the smaller base is riveted or in any other suitable manner connected with the lever arm 417a. A bore 412b is made from the lower end surface of the body of inertia 412, and against the bottom of this bore the part indicated with 438 is resting with its upwards turned base. The base of the part 438 is somewhat recessed, which means that its surface bearing against the bottom of the bore 412b is limited to a sharp peripherical edge. The conic part 438 rests with its pointed top in a conical cavity 410a in the bearing surface.

The angle between two opposing wall portions of the cavity 410a is adjusted in such a manner that the wall of the cavity forms a stop for the part 438 in a maximum desired pivoting out position of the distance element. The part 438 as well as the part 412 can be made of comparatively heavy material, but a good performance is also obtained if it is made of light material, by way of example a plastic compound. The radial extension of the surfaces with which the two parts 412 and 438 are in contact with each other are suitably adjusted in such a manner that a pivoting out is not obtained in connection with a slight braking of the vehicle, but that a tilting is taking place as soon as the retardation or acceleration exceeds normal values. Because of the fact that the point of articulation, at which the two parts are in contact with each other, also during the pivoting out movement is sidewise displaced, an upwards movement of the lever arm 417a is obtained in connection with a pivoting out movement. Due to the pointed portions, with which the distance organ is in contact with the lever 417 and the bearing surface and the annular bearing between the two parts 412 and 438 a uniform movement of the lever arm 417 is obtained irrespective of in which direction the force of inertia is working. In connection with the pivoting in counter clockwise direction of the lever 417 round the shaft 416, which is caused by the pivoting out of the distance element 412, 438 a pull is taking place in the arm 419b of the lever 419 via the bar 435, whereby the lever 419 is pivoted in counter clockwise direction round its shaft 420 in such a manner that its arm 419a engages the ratchet wheel 6a. The pressure spring 437 tends to reset the lever system and consequently also the distance element 412, 438 to the normal or unbiased position illustrated in the FIGS. 8 and 9, as soon as the pulling force in the safety belt of the vehicle and consequently the pushing force keeping the arm 419a engaged to the ratchet wheel 6a ceases to operate.

Figure 12:
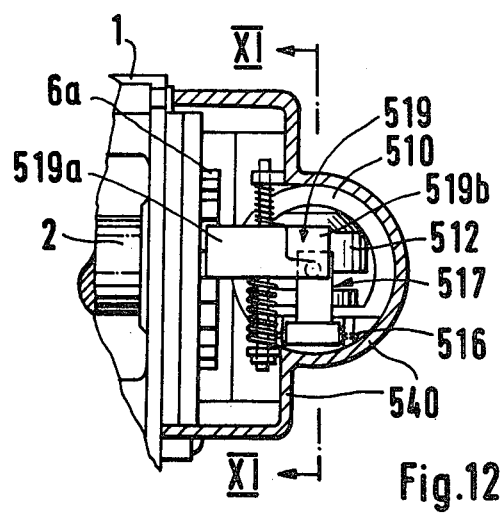

In the FIGS. 11 and 12 the body of inertia is indicated with 512 and is of the same type as the body of inertia shown in the FIGS. 3 and 4 indicated with 112. The hollow body containing the body of inertia is indicated with 510 and comprises two circular end walls 548 and 549, which in their lower portions are connected with each other via a bearing surface 541 supporting the body of inertia and a bar 550 extending between them. The lever arms via which the body of inertia 512 actuates the ratchet wheel 6a are indicated with 517 and 519 respectively. In this embodiment the pivoting axis of the body of support 510 of the body of inertia is substantially directed at a right angle to the axis of rotation of the band core 2, and is placed in a housing 540, which in its turn is pivotably mounted on the frame 1 supporting the band reel in such a way that its pivoting axis coincides with the center axis of the band core 2. The body of inertia 512 in the normal position illustrates in the drawing rests with a wide base surface on a bearing surface 541 and is linked to the body of inertia in connection with one lever arm 517a of the lever 517. The lever arm 517a is pivotably mounted in the supporting body 510 of the body of inertia by means of a shaft 516, which extends crosswise to the pivoting axis of the body of support of the body of inertia. The other lever 519 is pivotably journaled on a shaft 520 arranged in the housing 540 outside of the supporting body 510 of the body of inertia, which lever 519 by means of a torsion spring 544 is kept with one of its lever arms 519b in contact with a preferably spherically shaped knob 545 on the lever arm 517b of the lever 517. A pressure spring 546 is provided on the side of the lever 519, which is opposed relative to the torsion spring 544, said pressure spring extending between the lever 519 and a stop dog in the housing 540, and which together with the torsion spring 544, which also serves as a pressure spring, tends to keep the lever in the rest position illustrated in the drawing. The housing 540 can be locked in any desired pivoting position by means of clamps 547, which can be screw fastened to the frame 1. During the pivoting movement of the housing 540 to a desired position of adjustment, the lever arm 519a of the lever 519, which lever arm 519a serves as a pawl, will describe a path of movement shaped like a circular arc along the periphery of the ratchet wheel, which means that the cooperating engagement of the lever arm 519a with the ratchet wheel remains unchanged irrespective of the pivoting position which the housing 540 may occupy relative to the frame 1. When, by actuation of the locking body 512 via the pulling bar 542 and the lever arm 517, the locking lever arm 519a reaches its position of engagement with the ratchet wheel 6a, this lever arm 519a in connection with the rotation movement of the ratchet wheel will be carried along for a short distance against the bias of the pressure spring 546 and along the shaft 520, which means that the stresses on the activating organ will be very slight also in the case that the locking device in question does not manage immediately to stop the rotation movement of the band core 2.

By means of the arrangement illustrated in the FIGS. 11 and 12 a possibility is obtained to place the resting plane 541 of the supporting body of the body of inertia in horizontal position and entirely independent of the position in which the band reel and its frame 1 are mounted in a vehicle.

The invention is not limited to the above described and in the drawings illustrated embodiments, which are given by way of example only, but can be varied with respect to its details within the scope of the following claims without therefore departing from the fundamental idea of the invention.

What I claim is:

1. An activating organ prefereably to be used in connection with band reels of safety belts for vehicles comprising a frame, a safety belt core rotatably mounted on said frame and having a longitudinal axis of rotation, a locking mechanism being operatively connected to said core and being operable when abnormal changes of the movement of the vehicle takes place, a body of inertia, transmission means being operatively connected to said locking mechanism and said body of inertia, a hollow supporting body being rotatably mounted and having an axis of rotation transverse to said core axis of rotation, said body of inertia being supported by and in said supporting body, said transmission means including two levers each having two lever arms, and each having one of its lever arms extending in a cross-wise direction to said supporting body axis of rotation, one of said levers being pivotally mounted on said frame with a pivoting axis parallel to said core axis of rotation, the other of said levers being pivotally mounted on said supporting body with a pivoting axis transverse to said supporting body axis of rotation, said levers having further arms extending parallel to each other and transverse to said supporting body axis of rotation, and said further arms having point contact with each other, said contact point being positioned on said supporting body axis of rotation.

2. An activating organ according to claim 1 including a bearing surface on said supporting body having an outer delimitation of annular shape and having said body of inertia resting thereon, said body of inertia being arranged under the influence of sidewise directed forces of inertia to be brought to tilt around said outer delimitation of said bearing surface and thereby obtain an upwards directed movement for pivoting said other lever further arm.

3. An activating organ according to claim 2 wherein said body of inertia comprises a ball against the top surface of which said one arm of said other lever rests.

4. An activating organ according to claim 3 including a shaft pivotally supporting and providing the axis of pivoting of said other lever between its contact against said ball and its contact with said one lever, its contact surface facing said ball increasing in height above said bearing surface in the direction towards said pivoting shaft for compensation of the magnitude of the lifting movement of said ball in a direction towards and in a direction away from, respectively, said pivoting shaft.

5. An activating organ according to claim 2 wherein said other lever has a portion resting against the underside of said body of inertia.

6. An activating organ according to claim 2 wherein said body of inertia has a comparatively narrow intermediate section located between a base part resting on said bearing surface and an upper portion which has a comparatively great mass.

7. An activating organ according to claim 2 wherein said body of inertia has a part of a distance element extending between said bearing surface and said other lever and having its ends pivotally linked to said other lever and said bearing surface respectively, said distance element comprising at least two parts of a toggle type, which are pivotable relative to each other by the actuation of said body of inertia, and which are linked to each other, to said lever and to said bearing surface respectively, in such a manner that the distance between said bearing surface and said lever increases in connection with a toggle-like pivoting movement of said two parts in one direction or the other.

8. An activating organ according to claim 1 wherein said supporting body comprises a cylindrical housing, one end wall of which has a groove in concentric arrangement relative to the pivoting axis of the housing with a freely movable ball introduced in the same and an index marking located adjacent said groove and being made in the portion of said housing which is intended in the normal position of the same to be located undermost.

9. An activating organ according to claim 1 wherein said locking mechanism includes said a ratchet wheel, one of said levers serves as a pawl against said ratchet wheel, a shaft pivotally supports said one of said levers, a spring is displaceable along said shaft and biases said one of said levers whereby said lever can be carried along somewhat in the movement of roataion rotation of sid ratchet wheel when in connection with its engagement with said ratchet wheel.

* * * * *